Jan. 10, 1950 N. F. ANDREWS ET AL 2,494,080
HITCHING ARRANGEMENT FOR HARVESTERS
AND ALLIED EQUIPMENT
Filed Nov. 20, 1944 8 Sheets-Sheet 1

FIG. 1

INVENTORS
N.F. ANDREWS, R.L. DORT, S.E. HILL,
J. VERGER & W.J. COULTAS.
BY
ATTORNEYS

Jan. 10, 1950     N. F. ANDREWS ET AL     2,494,080
HITCHING ARRANGEMENT FOR HARVESTERS
AND ALLIED EQUIPMENT Filed Nov. 20, 1944     8 Sheets-Sheet 7

FIG. 8

*INVENTORS*
N.F. ANDREWS, R.L. DORT, S.E. HILL,
J. VERGER & W.J. COULTAS.

BY

ATTORNEYS

Patented Jan. 10, 1950

2,494,080

UNITED STATES PATENT OFFICE 2,494,080

HITCHING ARRANGEMENT FOR HARVESTERS AND ALLIED EQUIPMENT

Norman F. Andrews, Moline, Ill., Russell L. Dort, Davenport, Iowa, and John Verger, Rock Island, Wilbur J. Coultas, Moline, and Stanley E. Hill, Glen Ellyn, Ill., assignors to Deere & Company, Moline, Ill., a corporation of Illinois Application November 20, 1944, Serial No. 564,292

19 Claims. (Cl. 56—18)

The present invention relates generally to agricultural implements and more particularly to corn harvesters of the type adapted to be pulled in back of a tractor or other draft device, and has for its principal object the provision of a novel and improved corn harvester which is lighter in weight and simpler in construction and therefore less expensive to manufacture, but which is more efficient, stronger, and more durable than corn harvesters heretofore known to those skilled in the art.

A further object relates to the provision of a novel corn harvester that is adapted to be towed behind a tractor, but which is compact and sufficiently narrow that it will harvest the row of corn adjacent one of the rear wheels of the tractor, while providing enough room to accommodate a wagon or trailer to be hitched to the tractor alongside the corn harvester for receiving the harvested ears of corn therefrom, the wagon and the implement being disposed with the implement wheels in transverse alignment with the front wheels of the wagon, whereby the entire assembly of machines requires only the width of two rows of corn in addition to the rows being harvested. Thus, when opening a field, it is necessary to pick only two rows of corn by hand along the fence, or the machine can be used to follow a two-row tractor-mounted corn picker without any hand picking.

Another object relates to the provision of a simplified wagon hitch for pulling the wagon directly behind the tractor, using the same wagons which are used with the mounted pickers. A related object has to do with the provision of a novel wagon elevator which can be adjusted to direct the harvested ears of corn toward either end of the wagon and thus distribute the corn without the necessity for adjusting the wagon hitch.

A more specific object related to the above objects, has to do with the provision of an improved draft connection between the implement and the tractor, which requires less room transversely of the implement and which is quickly and easily adjusted laterally to provide for towing the implement directly behind the tractor when transporting the same from one field to another.

Still another object relates to the provision of an improved counterbalancing mechanism which is considerably lighter in weight than those heretofore known to the art and which efficiently provides for facilitating vertical adjustment of the gatherers but which tends to eliminate any bouncing action of the gatherer points during operation.

A further object relates to the provision of an improved adjusting mechanism for raising and lowering the gatherers, with provision made for eliminating excess lost motion between the adjusting lever latch quadrant and the frame on which the latter is mounted.

Still a further object of the present invention relates to a novel and improved frame construction in which tubular members are rigidly assembled in such a way as to provide a maximum strength and rigidity but with minimum weight and cost. More specifically, it is an object of our invention to provide a fabricated tubular frame which offers a maximum of rigidity for the gatherers, and in this connection it is an object to provide an improved means for connecting the longitudinally extending gatherer supporting tubular members to the main transverse tubular frame beam.

Still another object relates to the provision for using certain of the tubular frame members as a housing for the power transmitting shaft.

Another object relates to the provision of a take-up device for the ear conveyor chains, of novel and improved construction, which provides a spring mechanism for automatically taking up slack in the chains but which provides for quickly and easily disabling the springs and relieving the pressure on the chains so that the latter may be removed or repaired.

Another object relates to the provision of a novel discharge spout for the wagon elevator, with means for swinging the spout toward one end or the other of the wagon to distribute the ears of corn therein, with mechanism which can be adjusted by the tractor operator without leaving his seat on the tractor.

These and other objects and advantages of my invention will be apparent to those skilled in the art after a consideration of the following description, in which reference is had to the drawings appended hereto, in which.

Referring now to the drawings, the corn picker is indicated in its entirety by reference numeral 25 and comprises a main supporting frame 26, a forwardly extending draft frame 27 pivotally connected to the main frame 26 for vertical swinging movement about a transversely extending axis, and a wagon elevator 28 which is swingably mounted on the main frame for vertical movement about a longitudinal axis, as will be described later. Mounted on the main frame 26 is a two-row gathering mechanism, indicated in its entirety by reference numeral 29, and a husking box indicated by reference numeral 30, which receives the harvested ears of corn from the gathering mechanism, husks the ears, and delivers the latter to the wagon elevator 28.

Figure 8:
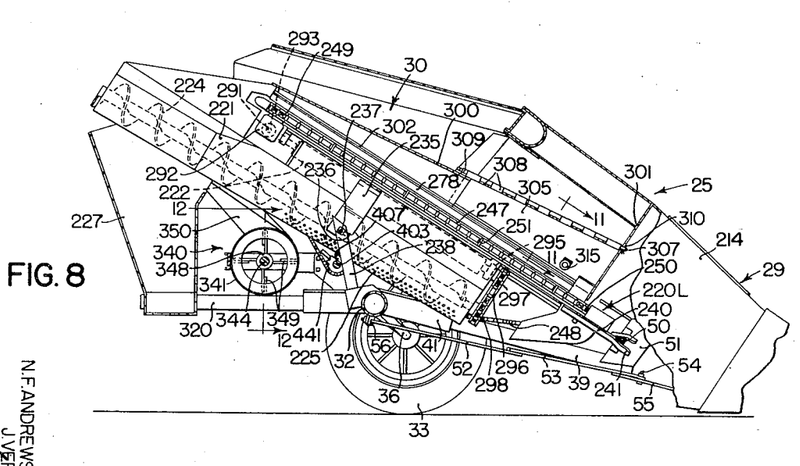
Figure 8 is a sectional elevational view taken along the approximate center line of the implement.
Figures 9, 10, 11, 12:
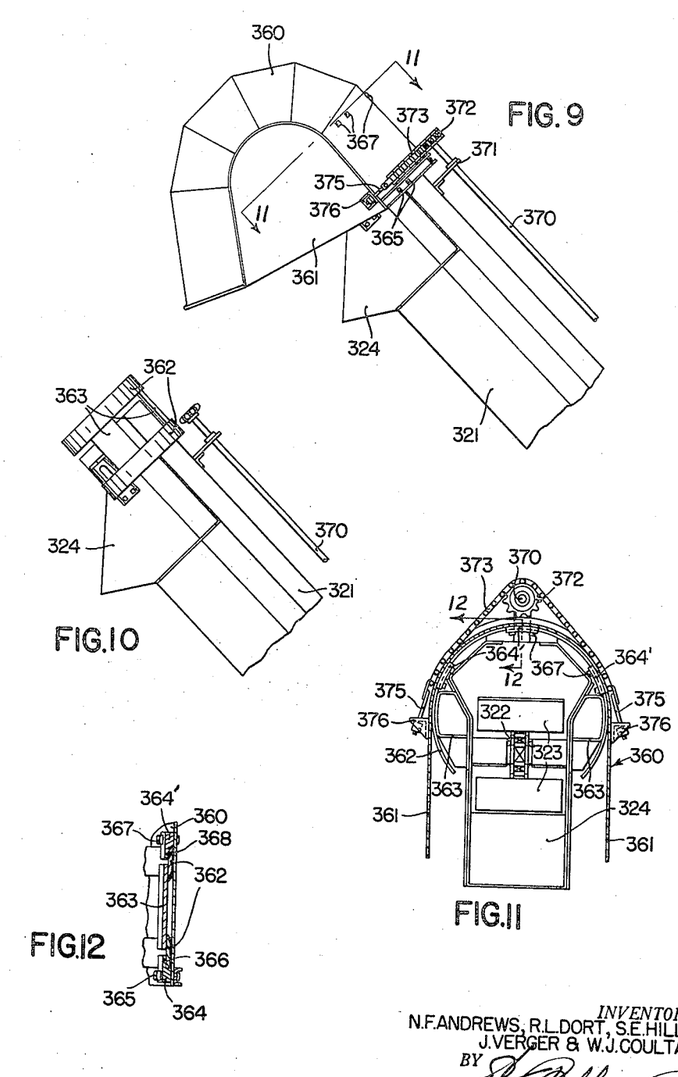
Figure 9 is an elevational side view of the upper portion of the wagon elevator.
Figure 10 is a view similar to Figure 18, but with the ear directing spout or hood removed.
Figure 11 is a sectional view taken along a line 11—11 in Figure 18.
Figure 12 is a detailed sectional view taken along a line 12—12 in Figure 20.

The implement or supporting frame 26 comprises a main transverse tubular supporting beam 32 carried on a pair of laterally spaced ground engaging wheels 33, 34 disposed at the grainward and stubbleward sides of the corn picker, respectively. Each of the wheels 33, 34 is journaled on an axle 35 (Figure 4) on the end of a curved axle supporting arm 36, the opposite end of which is inserted diametrically through aligned apertures in the respective end of the main tubular beam 32 and is rigidly secured thereto, as by welding. As best indicated in Figures 4 and 8, each of the axle arms 36 is inclined forwardly and downwardly from the main transverse beam 32, with the axle portions 35 extending outwardly in coaxial relation.

Figure 4:
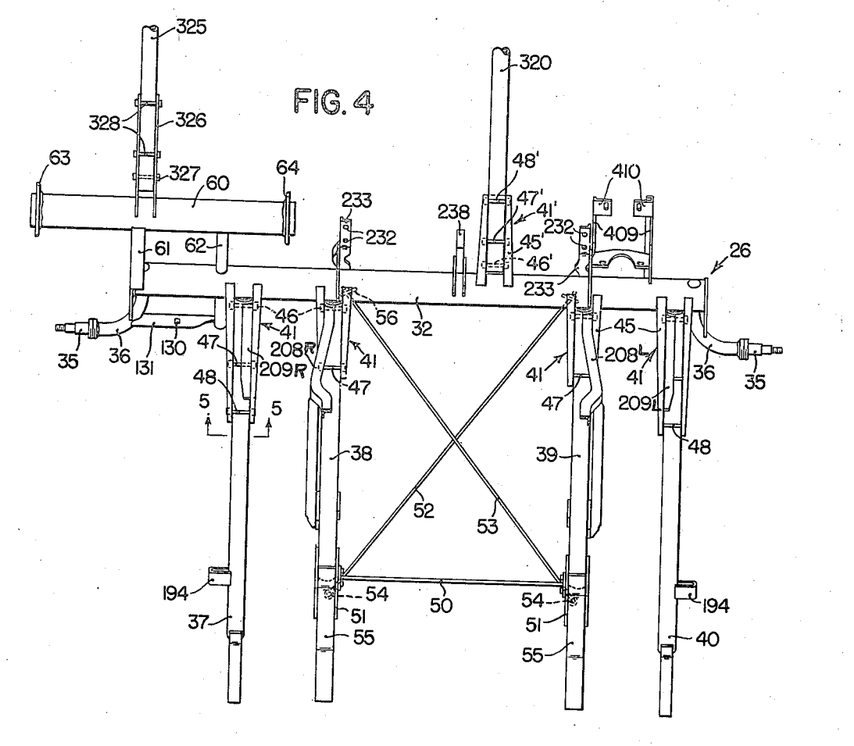
Figure 4 is a plan view of the frame of the corn picker with the wheels, body, and operating mechanism removed.
Figure 5:
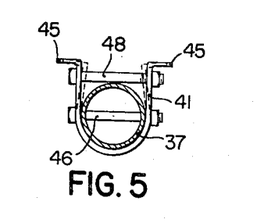
Figure 5 is a detailed sectional view taken along a line 5—5 in Figure 4 and drawn to an enlarged scale, showing a detail of construction of the frame.

The main implement frame 26 also includes two pairs of gatherer supporting arms 37, 38 and 39, 40 (see Figure 4). From Figures 4 and 6 it will be clear that each of the arms 37, 38, 39 and 40 comprises a metal tube which is rigidly mounted substantially perpendicular to the main tubular beam 32 by means of a supporting bracket 41 in the form of a U-shaped channel, within which the tubular arm is laid with its inner end in abutment with the main beam 32. The channel-shaped bracket 41 has its inner end fitted to the contour of the main beam 32 (Figure 5) and is welded rigidly thereto along the line of intersection. The upper edges of the channel 41 are turned outwardly to provide longitudinally extending flanges 45 which serve to strengthen and rigidify the bracket. The inner end of each of the tubular arms is secured to the bracket by means of a bolt 46 which extends diametrically through aligned apertures in the two sides of the channel-shaped bracket 41 and through the tubular arm 37, closely adjacent the end of the latter. Two other bolts 47, 48 extend through aligned apertures in the sides of the channel-shaped bracket 41 in longitudinally spaced relation to each other and to the bolt 46, but offset upwardly from the last mentioned bolt to pass over the top of the arm, as best shown in Figure 5. These two bolts 47, 48 serve to draw the sides of the channel 41 inwardly as indicated in dotted lines, to securely clamp the tubular arm within the bracket, but without weakening the arms by extending through perforations therein.

The two inner tubular arms 38, 39 are supported on brackets 41 which are slightly shorter than the outer arm brackets and have only one clamping bolt 47, but these two arms are rigidly braced by means of a transverse tie rod 50 which is fixed at opposite ends thereof, respectively, to a pair of clamping plates 51 which are rigidly fixed to the arms 38, 39, respectively. These two arms are also further braced by a pair of crossed diagonal tie rods 52, 53 (Figure 4), which are bolted at 54 at their forward ends, to frame members 55 extending forwardly from the tubular arms, and at their rear ends the tie rods 52, 53 are secured to a pair of ears 56 (see Figures 7 and 8), fixed to the bottom of the tubular main beam 32.

A second transverse tubular frame beam 60 is offset upwardly and rearwardly from the main beam 32 (Figure 6) and is disposed parallel thereto. A second beam 60 is rigidly mounted on a pair of laterally spaced members 61, 62 which are rigidly fixed as by welding, to the main beam 32 and to the second beam 60. The outer support 61 is in the form of a channel member which is welded to the stubbleward end of the main beam 32, which terminates adjacent the side of the wheel 34, while the other member 62 is in the form of a tube which extends through diametrically aligned apertures in the main beam 32 and extends both forwardly and rearwardly therefrom. The second transverse tubular member 60 is appreciably shorter than the main member 32 but extends laterally beyond the stubbleward end of the latter and terminates at a point outwardly of the outer plane of the wheel 34. The tubular member 60 is provided with a pair of flanges 63, 64 rigidly fixed thereto, as by welding, as best illustrated in Figure 4.

A gear housing 65 is fixed to the outer flange 63 by means of a plurality of bolts 66 which extend through aligned openings in the flange 63 and in a flange 67 provided on the gear housing and adapted to fit snugly against the flange 63. The gear housing 65 is provided with a socket portion 68, cast integrally with the housing 65 and disposed on the end of the latter, and adapted to receive a tubular bar 69, which extends forwardly and downwardly therefrom substantially parallel to the supporting members 61, 62 for the tubular member 60. The bar 69 is secured in the socket 68 by means of a suitable pin or rivet 70, extending through aligned apertures in the socket 68 and bar 69.

The forward end of the bar 69 terminates substantially in alignment with the axle 36 and outwardly thereof, and is connected by means of a universal joint 75 to a draft bar 76. Thus, the draft bar 76 is swingable relative to the bar 69 in a vertical direction about a transverse pivot bolt 77 and in a horizontal direction laterally about a substantially vertical bolt 78. The draft bar 76 is one of a pair of forwardly converging bars which comprise the draft frame 27. The other bar 80 of the draft frame 27 is swingably connected by means of a universal joint 81, best shown in Figure 6, to the lower end of the tubular member 62, ahead of the main beam 32. The draft bar 80 is swingable vertically relative to the tubular member 62 about a transverse pivot bolt 82 which is part of the universal joint 81, and the bar 80 is swingable horizontally about the generally vertical pivot bolt 83. The two universal joints 75, 81 are disposed substantially in transverse alignment, with the transverse pivot bolts 77, 82 disposed approximately coaxial with the axis of rotation of the wheel 34.

Figure 1:
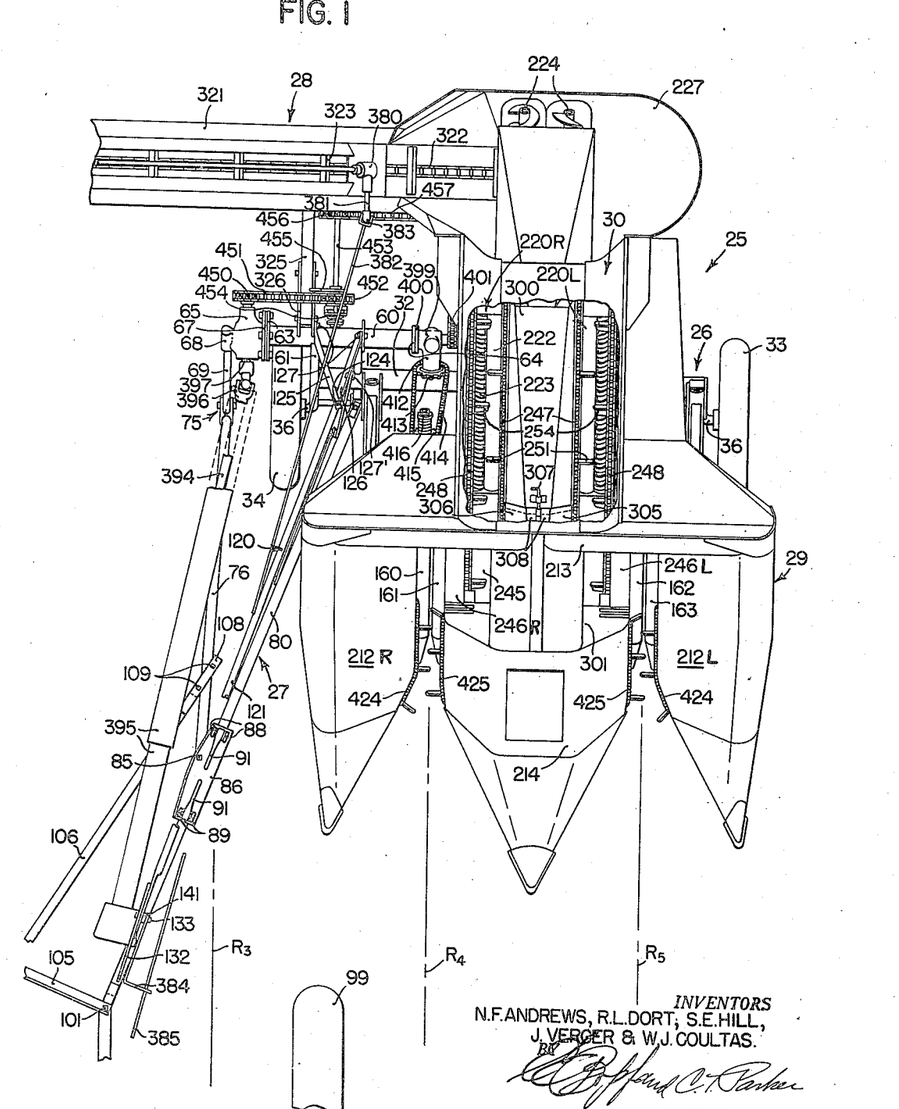
Figure 1 is a plan view of a two-row, tractor pulled corn picker embodying the principles of our invention, in which a portion of the top wall is broken away to show the husking and conveying mechanism.
Figure 2:
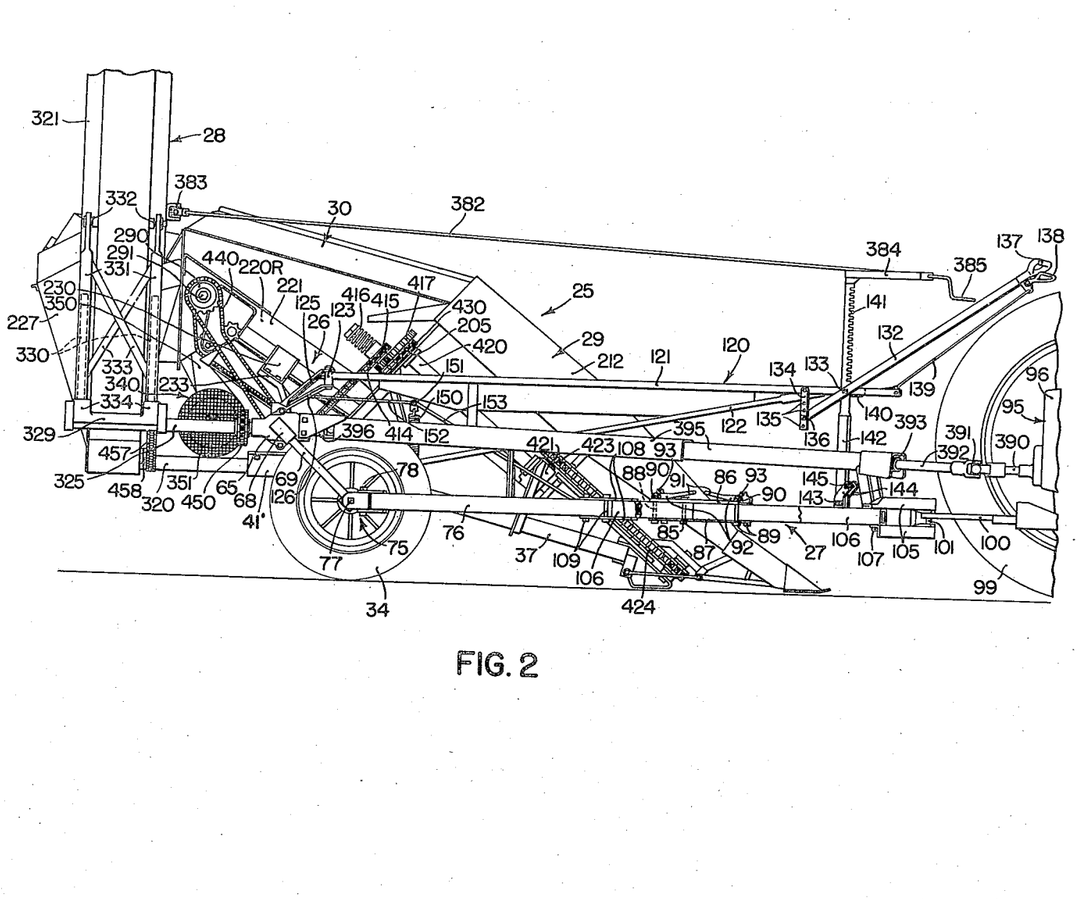
Figure 2 is a side elevational view of the corn picker.
Figure 3:
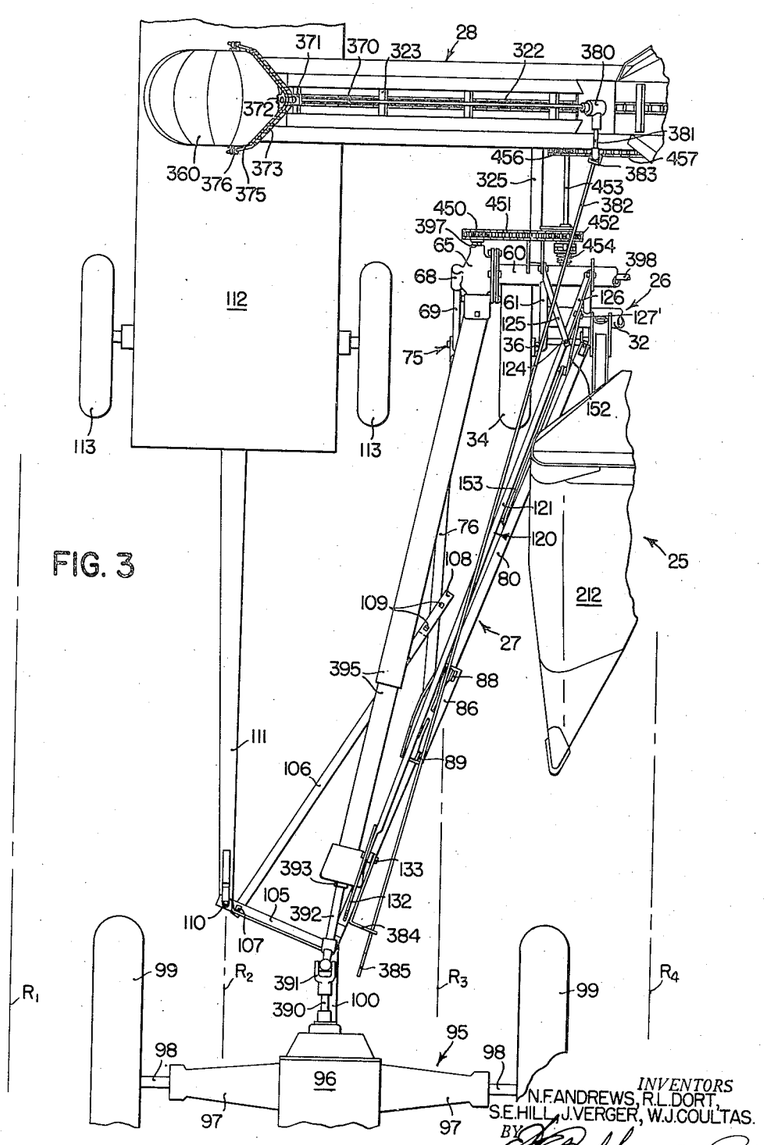
Figure 3 is a plan view showing a portion of the corn picker, tractor, and wagon, with the draft connections therebetween, showing the relations between the three vehicles during operation and their positions relative to the several rows of corn, which are indicated in broken lines in this figure.

The two draft bars 76, 80 converge forwardly ahead of the wheel 34. The forward end of the outer draft bar 76 is pivotally connected by a vertical bolt 85 to a pair of upper and lower plates 86, 87, above and below the draft bar 80, respectively (Figure 2). The plates 86, 87 are interconnected by two pairs of eyebolts 88, 89, one pair 88 being disposed on laterally opposite sides of the draft bar 80 interconnecting the rear ends of the plates 86, 87, while the other pair 89 of eyebolts is disposed on laterally opposite sides, respectively, of the draft bar 80, interconnecting the forward ends of the plates 86, 87. The eyes of each pair of eyebolts are interconnected by a common pin 90 (see Figure 2), and journaled on each pin 90 is a hand lever 91, which is provided with a camming surface 92 which is engageable with the upper plate 86 to draw the eyebolts upwardly, thereby clamping the plates 86, 87 rigidly against the top and bottom of the draft bar 80. In the position of the levers 91 shown in Figures 1 and 2, the plates 86, 87 are in rigidly clamped position, with the levers 91 lying against the upper plate 86, and extending across the latter toward each other. However, by swinging the levers 91 upwardly about the pivot pins 90, the clamping bolts 88, 89 are thereby relieved from tension, permitting the plates 86, 87 to slide longitudinally of the draft bar 80. In loosened position, each of the levers 91 stands vertically on the plate 86 and is held in this position by a short toe 93 (Figure 2). In this position, the draft bars 76, 80, are free to swing laterally about their universal joints 75, 81, to adjust the position of the forward end of the bar 80 laterally with respect to the implement 25. The bars 76, 80 are shown in Figures 1 and 3 in operating position to connect the implement 25 to a tractor 95 for corn harvesting operation, in an offset position relative to the tractor. However, for transporting the implement 25 from one field to another, the draft bars 76, 80 are shifted laterally toward the implement to provide a more direct forward pull on the implement, to cause it to trail directly behind the tractor 95. When shifting the draft bars from one position to the other, the plates 86, 87 slide longitudinally along the draft bar 80, and when the bars are properly adjusted, they can be tightly clamped together by forcing the levers 91 downwardly toward each other to apply tension to the eyebolts 88, 89.

The tractor 95 is illustrated in Figures 2 and 3 by merely showing the rear end of the tractor body 96, which is provided with laterally extending rear axle housings 97, which are carried on a pair of drive axles 98 mounted on traction wheels 99. The tractor 95 is provided with the usual drawbar 100 connected to and extending rearwardly from a tractor body 96, and the forward end of the draft bar 80 is swingably connected to the drawbar 100 by means of a vertical draft pin 101.

A simple wagon hitch is provided by a pair of bracing members 105, 106 which are pivotally connected together by a bolt 107. The member 105 comprises a pair of upper and lower angle irons which are connected to the draft pin 101. The other member 106, which is stressed in compression during operation, comprises a hollow rectangular beam, having a pair of vertically spaced straps 108 rigidly fixed, as by welding, to its rear end and spaced to receive therebetween the draft bar 76 in longitudinally slidable relation. A pair of clamping bolts 109 interconnect the two bracket straps 108 on opposite sides of the draft bar 76 and can be tightened to secure the member 106 rigidly to the draft bar 76. The forward member 105 is extended laterally beyond the pivot bolt 107 and is provided with a suitable aperture for receiving a draft pin 110 of a tongue 111 of a wagon 112. By loosening the bolts 109 the wagon hitch member 106 can be slid longitudinally of the draft bar 76 to adjust the position of the wagon in a fore and aft direction. Preferably, the axis of revolution of front wheels 113 of the wagon are disposed substantially in transverse alignment with the axis of the wheels 33, 34 of the harvester, as best indicated in Figure 3. With this arrangement, the wagon and harvester trail behind the tractor in side-by-side relation and do not interfere with each other, even when they are making a turn in either direction. No spacing bar is necessary between the wagon and the implement at any time.

Referring particularly to Figures 1 and 3. the row centers are indicated by broken lines $R_1$, $R_2$, $R_3$, $R_4$ and $R_5$. With the tractor straddling rows $R_2$ and $R_3$, with its traction wheels set to run between rows $R_1$ and $R_2$ and rows $R_3$ and $R_4$, respectively, the wagon 112 is set with its wheels to straddle row $R_2$, while the corn harvester is positioned with its stubbleward wheel 34 substantially in longitudinal alignment with the left hand tractor wheel 99, it is evident that the tractor and the wagon occupy or travel over only the two row spacings adjacent the row or rows being harvested. Thus, when opening a field, it is necessary to hand-pick only the first two rows adjacent the fence, or if a two-row tractor-mounted picker is available, the harvester disclosed herein can be used to follow directly behind the tractor-mounted picker when opening the field. This is accomplished by virtue of the narrower overall width of the corn harvester, which results from connecting the forwardly converging draft bars 76, 80, in straddling relationship to the stubbleward wheel 34. Obviously, if the wheel 34 were placed outside the outer draft bar 76, it would interfere with the adjacent wheel 113 of the wagon. Likewise, the draft frame 27 would interfere with the wagon if it were placed entirely outside of the wheel 34. Therefore, the arrangement shown in Figure 3, with the draft frame 27 straddling the wheel 34, is the most efficient arrangement with regard to the transverse spacing to obtain room for the corn harvester 25 and wagon 112 to be drawn in side-by-side relation.

Figure 6:
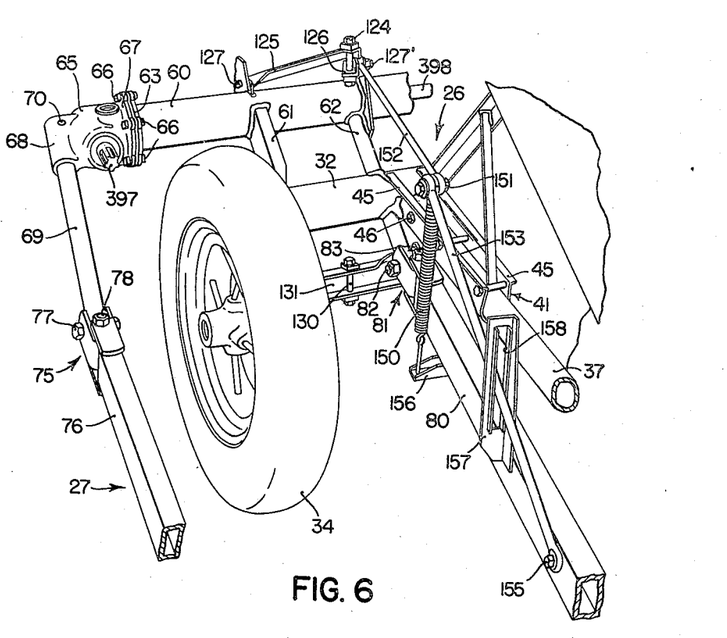
Figure 6 is a perspective view showing a portion of the corn picker in the vicinity of the connections between the draft frame and the implement frame, including the counterbalancing mechanism.

The front end of the gatherer unit 29 is raised and lowered by means of an adjusting lever 120 comprising a pair of vertically spaced forwardly converging tubular members 121, 122, best shown in Figure 2, connected at their rear ends to the implement frame 26 and extending forwardly over the draft frame 27. The upper member 121 is provided with a vertically disposed connecting sleeve 123, which is pivotally supported on a generally vertical pivot bolt 124 supported in a pair of bracket arms 125, 126, the rear ends of the latter being secured to the transverse tubular member 60 by bolts 127 and extending forwardly therefrom in converging relation, their forward ends being connected by the bolt 124, as best shown in Figure 6, in which figure the adjusting lever is removed to more clearly expose the other details of construction. The lower member 122 of the adjusting lever 120 is pivotally connected to a vertical bolt 130 (Figure 6), which is supported between the upper and lower flanges of a transverse channel member 131 rigidly secured between the lower end of the arm 62 and the lower end of the axle member 36. The bolts 124, 130 are substantially in vertical axial alignment, to provide for lateral swinging movement of the adjusting lever 120 when the draft bars 76, 80 are adjusted laterally, but providing a rigid connection by which the implement frame 26 can be tilted vertically about the transverse axis of the supporting wheels 33, 34. The forward end of the lever 120 is provided with an adjustable handle bar 132 (Figure 2) which is pivotally connected to the upper lever member 121 by means of a bolt 133, and which is connected at its rear end to a vertical bracket 134, which depends from the upper member 121 and is provided with a series of apertures 135, to which the rear end of the handle bar 132 is connected by a bolt 136. The forward end of the handle bar 132 is provided with a manual grip 137 and a latch lever 138, which is connected by a latch rod 139 to a suitable latch 140, the latter being selectively engageable with a vertically disposed rack bar 141 mounted on a standard 142 which is pivotally supported on a transverse bolt 143 between a pair of bracket arms 144 best shown in Figure 2. The bracket arms 144 are inclined upwardly and forwardly along opposite sides of the standard 142 and are interconnected by an adjusting bolt 145 in front of the standard 142, thus clamping the arms against the sides of the standard for the purpose of eliminating any lateral lost motion between the standard 142 and its mounting bolt 143. During operation, the implement frame 26 can be tilted about the axis of the wheels 33, 34 by disengaging the latch 140 by means of the latch handle 138 and swinging the adjusting lever handle 132 and the lever 120 in a vertical plane. Since the rack bar 141 is a straight bar, it pivots slightly about the bolt 143 as the handle 132 is raised and lowered. The handle 132 can be adjusted relative to the lever 120 by removing the bolt 136 and swinging the handle 132 about the pivot 133 to adjust the grip 137 vertically to the most convenient position adjacent the operator's station on the tractor 95.

The weight of the implement frame 26 is counterbalanced with respect to the draft members 76 and 80 by means of a counterbalancing spring 150, best shown in Figure 6. The spring 150 is disposed substantially vertically and is connected at its upper end to a pivot bolt 151, which interconnects the adjacent ends of a pair of toggle links 152, 153, which extend rearwardly and forwardly from the bolt 151, respectively. The rear end of the rear link 152 is swingably connected to a securing bolt 127' at the rear end of the bracket arm 126, while the forward end of the front link 153 is connected by a bolt 155 secured to the draft bar 80. The toggle links 152, 153 converge upwardly toward the connecting pivot 151, and the counterbalancing spring 150 is stressed in tension between the bolt 151 and a bracket 156 rigidly fixed, as by welding, to the lower side of the draft bar 80. Thus, the toggle links 152, 153 are stressed in compression, exerting a rearwardly acting force against the transverse tubular member 60, causing the frame 26 to be urged in a counterclockwise direction, as viewed in Figure 2, the reaction being applied downwardly and forwardly against the draft frame 27. By this arrangement, a much smaller spring will provide the necessary counterbalancing action, than is necessary with a direct acting counterbalancing spring. A guide 157 is fixed to the side of the draft bar 80 and is provided with a slot 158 which receives the forward link 153, the slot 158 being vertical to permit the link 153 to shift vertically therein as it pivots about the bolt 155, while preventing lateral movement of the toggle links 152, 153.

The implement is provided with two pairs of cooperative snapping rolls 160, 161 and 162, 163 (Figure 1). The forward ends of the snapping rolls may be suitably journaled in bearings (not shown) mounted near the forward ends of the gatherer arms 37, 38, 39, 40, the details of which form no specific part of the present invention, reference being had to co-pending divisional application, Serial No. 794,309, filed December 29, 1947, for complete disclosure thereof.

Figure 7:
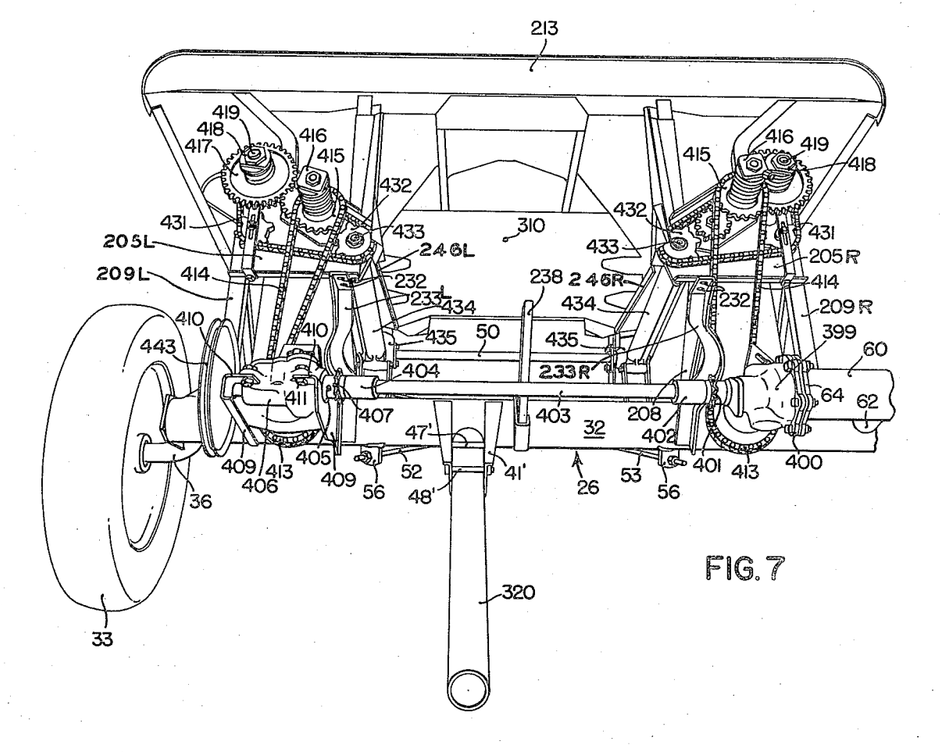
Figure 7 is a perspective view showing a portion of the rear of the corn picker, with the husking units, cleaning fan, and wagon elevator removed to show certain of the details of construction.

The rear ends of each pair of snapping rolls are rotatably supported on a mounting plate 205R, 205L, best shown in Figure 7. Each of the plates 205 is mounted on a pair of laterally spaced frame members 208R, 209R, 208L, 209L (Figures 4 and 7), rigidly fixed, as by welding, to the main transverse tubular beam 32 and extending upwardly and forwardly therefrom. The usual outer gatherers 212R, 212L are mounted on the outer gatherer arms 37, 40, respectively, in a more or less conventional manner, the details of which are not an essential part of the present invention. The rear ends of the gatherers are interconnected by a transversely disposed superstructure 213, and between the outer gatherers 212R, 212L is a conventional center gatherer 214, which is supported between the inner gatherer arms 38, 39.

Between the two pairs of snapping rolls are disposed two self-contained combined conveyor and husking units. Referring more particularly to Figures 1 and 8, each of the combined conveyor and husking units is indicated in its entirety by the reference numeral 220, the units 220 being similar but right and left-hand units, respectively, and therefore the right-hand unit is indicated in the drawings by reference numeral 220R while the left-hand unit is indicated by reference numeral 220L. Each of the units 220R, 220L comprises a rigid sheet metal housing 221, the upper portion of which contains a pair of cooperative husking rolls 222 journaled in the end walls of the housing 221, while the lower portion of the housing 221 serves as a trough into which the husks and silks are discharged from the husking rolls 222. An auger 224 extends through the entire length of the trough, for moving the husks and silks rearwardly and upwardly to discharge them from the rear end of the trough to the ground behind the implement. The front half of the trough is perforated as indicated at 225, the perforations being small to permit the passage of dust and dirt therethrough, but retaining any kernels that may be shelled from the ears by the husking rolls. The forward perforations 225 are over the ground, permitting the dust and dirt to fall harmlessly to the ground, while the rear portions of the units are disposed over a hopper 227, which is positioned to receive the kernels and ears of corn from the husking rolls.

The husking units 220 may be of the type disclosed and claimed in assignee's co-pending divisional application, Serial No. 794,375, filed December 29, 1947, wherein are shown husking units so designed that they may be easily removed from the implement for the purposes of repair or replacement. Only brief reference to such units will be made here. On the outer side of each of the housings 221 is provided a bracket 230 extending laterally outwardly and having a pair of bolt holes adapted to register with a pair of bolt holes 232 respectively in a pair of supporting members 233R, 233L (Figures 2 and 7), which are fixed to the main transverse tubular beam 32 (see also Figure 4). A second supporting bracket 235 is provided on the inner side of each of the housings 221 and is provided with a forwardly facing slot 236 (Figure 8), adapted to engage a bolt 237 in a generally vertical standard 238, which is rigidly fixed, as by welding, to the transverse beam 32. A forwardly extending supporting arm 240 is mounted on the forward end of the housing 221 and has a bifurcated front end portion 241, which straddles the tie rod 50. With this construction, each of the husking units 220R, 220L can be installed or removed individually, without the necessity for the operator to crawl under the machine.

The forward end of each of the units 220R, 220L is provided with an ear-receiving plate 245 extending forwardly from the front end of the housing 221 and positioned adjacent the associated pair of snapping rolls, as best indicated in Figure 1. The ears that are snapped from the stalks by the snapping rolls slide over aprons 246R, 246L and fall upon the receiving plate 245 adjacent thereto, from which the ears are conveyed rearwardly to the husking rolls by means of a pair of endless chain conveyors 247, 248. The inner conveyor 247 is trained around a pair of upper and lower sprocket wheels 249, 250. The chain 247 and sprockets 249, 250 are in a plane which is substantially parallel to the axes of the husking rolls, and have laterally extending paddles 251 which sweep rearwardly across the plate 245 and extend over the inner husking roll 222. The outer chain 248 is disposed in a generally vertical plane and has a plurality of ear-engaging paddles 254 which are staggered between the paddles 251 and extend over the outer snapping roll 223 (Figure 1). A generally similar arrangement of conveyor chains is disclosed and claimed in a co-pending application, now abandoned, Serial No. 525,884, filed March 10, 1944, by Andrews and Dort.

Power is supplied to the husking unit through a main sprocket 290 mounted on a transverse shaft 291 near the rear of the husking rolls 222 (Figure 2). The conveyor chain 248, may be driven by the shaft 291 and the shaft enters a gear box 292, within which power is transmitted to one of the husking rolls through a pair of intermeshing bevel gears 293 (Figure 8). A second pair of intermeshing bevel gears (not shown) is disposed in the inner end of the housing 292 for driving the upper conveyor sprocket 249. At the opposite end of the husking rolls, a pair of intermeshing gears 295 is provided for driving the other of the husking rolls in the opposite direction of rotation, as is well-known to those skilled in the art. The auger 224 is driven through a power transmitting chain 296, which interconnects a pair of sprockets 297, 298 fixed to the lower ends of the shafts of one of the husking rolls and the auger, respectively.

As best shown in Figures 1 and 8, the space between the two husking units 220R, 220L is covered over by means of a sheet metal hood or shield 300 extending forwardly from the rear end of the conveyors 247, 248, terminating rearwardly of the forward ends of the husking units, to provide an opening between the forward end of the shield 300 and a vertical wall 301 at the rear end of the center gatherer 214, for the purpose of obtaining access to the forward ends of the husking units.

The access opening between the forward end of the shield 300 and the wall 301 is covered by a pair of panels or doors 305, 306, best shown in Figure 1, which are hinged together by means of a hinge rod 307. The adjacent edges of the panels 305, 306 are bent angularly, as indicated at 308, along the hinge to provide a flat top which lies against the top of the shield 300 and serves as a continuation thereof, while the panels 305, 306 serve as extensions forwardly of the side walls of the shield 300. The hinge rod 307 is secured beneath a curved clip 309 (Figure 2) fastened to the top of the shield 300 and the forward end of the rod 307 extends through a hole 310 in the back wall 301 of the center gatherer 214.

The corn-receiving hopper 227 and the wagon elevator 28 form a single unitary structure which is swingably mounted at its lower end on a tubular arm 320 (Figures 4, 7 and 8), which is rigidly fixed to the transverse beam 32 and extends rearwardly substantially perpendicular to the latter. The arm 320 is mounted on the beam 32 by means of a channel-shaped support 41', similar to the channel-shaped supports 41 which rigidly mount the gatherer supporting arms 37, 38, 39 and 40 on the beam 32 in forwardly extending relation. The various parts of this mounting, which has been explained in connection with the gatherer supporting arms, are given coresponding reference numerals, to which prime indicia have been added. The hopper 227 has side walls which flare laterally outwardly and receive ears of corn as they are swept rearwardly over the gear housing 292 by the paddles 251, 254 of the chains 247, 248. Any kernels of corn that are carried rearwardly by the auger 224 along with the husks and silks, are also discharged into the hopper 227.

The wagon elevator 28 comprises a unitary casing structure 321, which extends upwardly and laterally from its swingable mounting on the rear end of the supporting arm 320. A conventional elevator chain 322 and crop engaging paddles 323 are disposed within the casing and serve to convey ears and shelled corn upwardly and discharge the latter over a downwardly inclined chute 324 into the wagon 112. The intermediate portion of the conveyor casing 321 is supported on a rearwardly extending tubular arm 325, fixedly mounted on the rear tubular frame member 50 by means of a channel-shaped member 326 which is rigidly fixed, as by welding, to the tubular member 60 and extends rearwardly therefrom. The tubular arm 325 lies within the member 326 and is secured therein by a bolt 327 which passes through aligned apertures in the sides of the channel member 326 and through the tubular arm 325 adjacent the forward end thereof. Two other bolts 328 extend through the sides of the channel member 326 above the tubular arm for clamping the sides together and securely retaining the arm 325 therein. A supporting member 329 (Figure 2) is mounted on the tubular arm 325 and is provided with a pair of upwardly extending fore and aft spaced shafts 330 disposed in telescoping relation to a pair of tubular supports 331, which are pivotally mounted at 332 on opposite sides of the wagon elevator casing 321. The tubular supports 331 are rigidly braced by a pair of cross braces 333, whereby the tubular members 331 support the elevator casing 321 on the member 329, which is provided with a pair of hubs 334, which serve as sockets for supporting the shafts 330 and also serve as stops for limiting the downward movement of the tubular supports 331 over the shafts 330 and thus support the elevator casing 321 in overhanging relation to the wagon 112, so that ordinarily the casing does not rest upon the side of the wagon. However, should the side of the wagon engage the elevator casing 321 during operation over rolling ground, the casing 321 is free to swing upwardly about its pivot axis, which is the axis of the tubular arm 329, while the tubular supports 331 accommodate this movement by sliding upwardly on the shafts 330.

Referring now more particularly to Figures 3 and 9-12, inclusive, the wagon elevator is provided with a discharge hood 360 for the purpose of directing the corn discharged from the wagon elevator downwardly into the wagon. The hood 360 is provided with means for controlling the same so that it can be set to direct the discharged corn toward the front or toward the rear of the wagon, selectively, for the purpose of filling the wagon evenly without the necessity for shifting the wagon fore and aft with respect to the corn picker in a conventional manner. The hood 360 comprises a large U-shaped sheet metal enclosure having imperforate side walls 361. The hood 360 is mounted on the outer end of the elevator casing 321 by means providing for rotation of the hood about an axis passing longitudinally through the casing 321. The elevator in its specific details forms no part of the present invention and is therefore illustrated and described only generally, and reference should be had to co-pending divisional application, Serial No. 6,675, filed February 6, 1948. This mounting means comprises a pair of cylindrical track members 362, which partially encircle the end of the elevator casing 321 but are interrupted at opposite sides of the discharge chute 324. The track members 362 are disposed in axially spaced relation and are supported on brackets 363 fixed to the sides of the elevator casing 321. The hood is supported on the tracks 362 by means of a plurality of shoes 364 spaced circumferentially around the edge of the hood and secured thereto by bolts 365. The shoes 364 are secured to the inside of the hood and have shoulders 366 which overlap the lower edge of the lower track 362. A second group of shoes 364' is secured to the inside of the hood 360 but spaced outwardly from the shoes 364 and is secured to the hood by bolts 367. The outer shoes 364' are provided with shoulders 368 which overlap the outer edges of the upper cylindrical track 362. Thus, the two sets of shoes, 364, 364' secure the hood against axial movement in either direction relative to the housing, but permit rotation of the hood about the axis of the housing.

The hood is rotated on the tracks 362 by means of a control rod 370 extending outwardly along the top of the elevator casing 321 and being rotatably supported in a bracket 371 near the outer end of the casing. A sprocket 372 is fixed to the outer end of the shaft 370 and engages a flexible chain 373 which extends around the hood 360 and is trained over the sprocket 372, and is anchored at opposite ends thereof, respectively, by means of bolts 375 secured to angular brackets 376 fixed to the side walls 361 of the hood 360, respectively.

The lower end of the control shaft 370 is journaled in a gear box 380 mounted on top of the elevator casing 321 adjacent the side of the hopper 227. A drive shaft 381 extends forwardly from the gear housing 380 and is connected by a suitable worm gear (not shown) to the control shaft 370. A manually rotatable shaft 382 is connected with the drive shaft 381 by a universal joint 383 and extends forwardly over the draft frame 27 and is rotatably supported at its forward end in a bracket 384 mounted on the upper end of the rack member 141. A handle 385 is provided on the end of the shaft 382, which is convenient to the operator of the tractor. By rotating the handle 385, the shaft drives through the universal joint 383, turning the drive shaft 381, which transmits power through the gears in the gear box 380 to drive the shaft 370, which rotates the sprocket 372 and thereby acts through the chain 373 to shift the hood 360 about the axis of the cylindrical track members 362. Hence by turning the handle 385, the operator while sitting on the tractor seat can adjust the direction in which the corn is discharged from the wagon elevator into the wagon.

Power is supplied to the gathering, conveying and husking mechanisms from the power take-off shaft 390 of the tractor 95. The power take-off shaft 390 is connected through a universal joint 391 to a short length of power shaft 392, which is connected through a second universal joint 393 to the usual telescoping power shaft 394 (Figure 1) which is enclosed in a pair of telescoping housing sections 395, the rear end of the shaft 394 being connected through a universal joint 396 to a splined stub shaft 397 best shown in Figure 6, which projects forwardly from the gear housing 65 mounted on the outer end of the tubular member 60. A transverse power shaft 398 extends through the tubular member 60 and is journaled at its outer end in the gear housing 65. The shafts 397, 398 are interconnected by a pair of bevel gears (not shown) suitably mounted within the housing 65. At the inner end of the tubular transverse member 60 is mounted a second gear box 399 having a flange 400 which is suitably bolted to the flange 64 on the inner end of the tubular member 60. The transverse power shaft 398 is journaled within the gear box 399 and extends beyond the gear box 399 to drive a sprocket 401 mounted adjacent the end of the shaft. A coupling couples the end of the shaft 398 to a shaft 403 which extends transversely across the implement beneath the husking units. The other end of the connecting shaft 403 is coupled by a coupling 404 to the end of a stub shaft 405 which extends laterally inwardly from a third gear box 406. A sprocket 407 is mounted on and fixed to the shaft 405 between the gear box 406 and the coupling 404. The gear box 406 is mounted on a pair of rearwardly extending bracket arms 409 (see Figures 4 and 7), the bracket arms 409 being provided with inwardly turned supporting flanges 410, to which the gear box is secured by bolts 411.

Each of the gear boxes 399, 406 is provided with a forwardly and downwardly inclined portion, one of which is indicated by reference numeral 412 in Figure 1, within which is a shaft (not shown) for driving a sprocket 413, power being transmitted thereto through a pair of bevel gears (not shown) within the respective housing 399, 406. Each of the sprockets 413 is connected to a flexible power transmission chain 414 which is trained around a sprocket 415, connected through suitable slip clutch mechanism 416 to drive the snapping rolls 160, 161, 162, 163. The sprockets 415 also drive gears (not shown) which transmit power to gears 417 connected through slip joint mechanisms 418 to power transmitting shafts 419 extending forwardly and inclined downwardly along the outer sides of the outer gatherers 212 and are enclosed in pipes 420, as indicated in Figures 2 and 7. The lower ends of the enclosing pipes 420 are secured to a pair of gear boxes 421 respectively, which contain bevel gears (not shown) for transmitting power from the shafts 419 to sprockets 423 for driving the gatherer chains 424.

The inner gatherer chains 425 on the inner gatherer 214, are driven by power transmitted through the gears 417, sprockets 430 (see Figure 2), and chains 431 trained over the sprockets 430 and around sprockets 432 which are mounted on shafts 433, which extend downwardly and forwardly through pipes 434 to gear boxes 435 (see Figure 7). The gear boxes 435 are substantially similar to the gear boxes 421 and drive the inner gatherer chains in a similar manner.

The husking units 220R, 220L receive power from the transverse shaft 398 as follows: A flexible chain 440 (Figure 2) is trained over the sprocket 401 and over the drive sprockets 290 on the shaft 291 on the husking unit 220R, from which the power is used to drive the husking rolls, the conveyor chains 247, 248, and the auger 224.

The left-hand husking unit receives power from sprocket 407 through a chain 441 (Figure 3), which extends upwardly along the outer side of the left-hand husking unit 220L and is trained over the drive sprocket 290 of that unit.

The wagon elevator receives power from the shaft 397, which extends rearwardly through the gear housing 65, to drive a sprocket 450 mounted thereon, which is connected by a chain 451 to a sprocket 452, which is mounted on a shaft 453 and drives the latter through a suitable slip clutch mechanism 454. The shaft 453 is journaled in a bracket support 455 mounted on the tubular supporting arm 325. The shaft 453 carries a sprocket 456 which is connected by a chain 457 to the sprocket 458 on the elevator drive shaft.

During operation, the tractor draws the implement in laterally offset relation to pick corn from the two rows adjacent the tractor and draws the wagon 112 directly behind the tractor and in transverse alignment with the implement. The stalks of corn are gathered by the gathering chains 424, 425 until they are engaged by the snapping rolls 160, 161, 162, 163, which draw the stalks downwardly and separate the ears therefrom, dropping the latter over the aprons 246 to the receiving plates 245, from which the conveyors 247, 248 move the ears upwardly and rearwardly over the husking rolls 222, 223. The ears are discharged over the rear ends of the husking rolls into the hopper 227, while the husks and silks which were separated from the ears are passed downwardly between the husking rolls 222, 223 into the auger trough in which they are moved by the auger 224 rearwardly, during which movement any fine dirt is discharged through the perforated bottom portion 225 while any kernels of corn that were shelled by the husking rolls are discharged into the hopper 227. The husks and silks and any leaves that may be mixed therewith, are discharged out of the rear end of the auger trough over the rear wall of the hopper 227 to the ground. The fan 340 directs two blasts of air through the corn dropping from the two husking mechanisms and further separates any dirt or light trash that may be included therewith, blowing the latter upwardly and rearwardly over the back wall of the hopper 227. The corn which falls into the hopper 227 is conveyed by the wagon elevator paddles 323 upwardly and laterally and is discharged through the rotatable hood 360 into the wagon. By controlling the hood 360 through the adjusting handle 385, the corn can be directed toward the front, center, or rear of the wagon and thus distribute the corn evenly through the wagon.

We do not intend our invention to be limited to the details shown and described herein except as set forth in the claims which follow.

We claim:

1. In a harvester including a rigid wheel-supported frame and harvesting means mounted thereon for gathering crops from the field, the combination of a pair of draft beams pivotally connected to said frame at laterally spaced points thereon for lateral swinging movement relative thereto, means for coupling the front end of one of said beams to a tractor, a connecting device slidable along said one beam, means pivotally connecting the front end of the other of said beams to said connecting device, and means for fixedly securing said connecting device to said one beam at selected points along the latter.

2. The combination set forth in claim 1, including the further provision that said connecting device comprises a sleeve member slidable over said one beam and contractable to grip the latter, and said securing means comprises at least one cam element journaled on said sleeve member and rotatable to contract said sleeve member to cause it to grip said beam, and having an adjusting arm fixed to said element for rotating the latter.

3. In a harvester including a rigid frame having crop gathering means extending forwardly and a pair of laterally spaced supporting wheels journaled thereon, the combination of a pair of draft beams pivotally connected to said frame at laterally spaced points thereon by means providing for both vertical and lateral swinging movement relative thereto, means for coupling the front end of one of said beams to a tractor, a connecting device slidable along said one beam, means pivotally connecting the front end of the other of said beams to said connecting device, means for fixedly securing said connecting device to said one beam at selected points along the latter, means operatively connected between the frame and one of said beams for tilting said frame about the axis of said wheels to raise and lower said gathering means, and means for fixing said frame to said beams in adjusted position.

4. In a harvester including a rigid frame having crop gathering means extending forwardly and a pair of laterally spaced supporting wheels journaled thereon, the combination of a pair of draft beams pivotally connected to said frame at laterally spaced points thereon on opposite sides of one of said wheels, respectively, by means providing for both vertical and lateral swinging movement relative thereto, means for coupling the front end of one of said beams to a tractor, a connecting device slidable along said one beam, means pivotally connecting the front end of the other of said beams to said connecting device, means for fixedly securing said connecting device to said one beam at selected points along the latter, means operatively connected between the frame and one of said beams for tilting said frame about the axis of said wheels to raise and lower said gathering means, and means for fixing said frame to said beams in adjusted position.

5. In a harvester, a rigid frame including a main transverse beam, forwardly extending arms fixed thereto for carrying crop gathering means, arms fixed to said beam adjacent opposite ends of the latter and mounted on ground wheels, arms fixed to said beam and extending to points substantially on the axis of said supporting wheels, a draft frame, and means pivotally connecting said draft frame to the last mentioned arms substantially on said axis for relative movement about the latter.

6. In a harvester, a rigid frame including a main transverse beam, forwardly extending arms fixed thereto for carrying crop gathering means, arms fixed to said beam adjacent opposite ends of the latter and mounted on ground wheels, a pair of forwardly converging draft beams adapted for connection to a tractor, an arm fixed to said beam adjacent one of said wheels and pivotally connected to one of said draft beams substantially coaxially of said wheel, an outer arm disposed outside said wheel and pivotally connected to the other of said draft beams substantially coaxially of said wheel, and supporting means for said outer arm extending around said one wheel and rigidly mounted on said beam.

7. In a harvester, a rigid frame including a main transverse beam, a supporting wheel disposed at one end of said beam, arm means rigidly fixed on said beam, means for rotatably mounting said wheel on said arm means on an axis offset from said beam, a second beam disposed generally parallel to said main beam and extending beyond said wheel, means rigidly interconnecting said beams, a pair of draft bars adapted to be coupled to a tractor and extending rearwardly in diverging relation, one of said bars being pivotally connected to said arm means substantially coaxially with said wheel, and an arm rigidly mounted on said second beam on the opposite side of said wheel and pivotally connected to the rear end of the other draft bar substantially coaxially with said wheel.

8. In a harvester, a rigid frame including a main transverse beam, a supporting wheel disposed at one end of said beam, a pair of laterally spaced arms fixedly mounted on said beam and extending longitudinally therefrom, supporting means for said wheel on the forward end of one one of said arms, a draft bar pivotally connected to the forward end of the other of said arms, for relative vertical swinging movement, a second transverse beam rigidly mounted on the rear ends of said arms and extending outwardly beyond said wheel, an arm rigidly mounted on said second beam and extending along the outer side of said wheel, and a second draft bar pivotally mounted on said outer arm substantially coaxially with said wheel, said draft bars converging forwardly and connected together ahead of said wheel.

9. In a harvester, a rigid frame including a main transverse beam, a supporting wheel disposed at one end of said beam, arm means rigidly fixed on said beam, means for rotatably mounting said wheel on said arm means on an axis offset from said beam, a transverse tubular beam disposed generally parallel to said main beam and extending laterally beyond said wheel, means rigidly interconnecting said beams, a power transmitting shaft disposed within said tubular beam and having connections at one end thereof with mechanism on said frame, a pair of draft bars adapted to be coupled to a tractor and extending rearwardly in diverging relation on opposite sides of said wheel, one of said bars being pivotally connected to said arm means substantially coaxially with said wheel, an arm rigidly mounted on said tubular beam on the opposite side of said wheel and pivotally connected to the other draft bar substantially coaxially with said wheel, and a power transmitting member connected to the other end of said shaft and extending forwardly along said draft bars and adapted to receive power from the tractor engine.

10. In a harvester, a rigid frame including a main transverse beam, a supporting wheel disposed at one end of said beam, arm means rigidly fixed on said beam, means for rotatably mounting said wheel on said arm means on an axis offset from said beam, a transverse tubular beam disposed generally parallel to said main beam and extending laterally beyond said wheel, means rigidly interconnecting said beams, a power transmitting shaft disposed within said tubular beam and having connections at its inner end with mechanism on said frame, a gear box mounted on the outer end of said tubular beam, a pair of draft bars adapted to be coupled to a tractor and extending rearwardly in diverging relation on opposite sides of said wheel, one of said bars being pivotally connected to said arm means substantially coaxially with said wheel, an arm rigidly mounted on said gear box and extending along the outer side of said wheel and pivotally connected to the other draft bar substantially coaxially with said wheel, a power shaft journaled in said gear box and extending along said draft bars and adapted to receive power from the tractor engine, and a pair of intermeshing gears in said gear box to transmit power between said shafts.

11. Corn harvestering apparatus, comprising in combination, a tractor having a pair of wheels spaced to run at opposite sides of two corn rows, respectively, a corn harvester disposed behind the tractor and offset on one side thereof and having a gatherer positioned to harvest corn from the next adjacent row on said one side, said harvester comprising a transverse frame on which said gatherer is mounted and a pair of laterally spaced supporting wheels therefor, and a hitch device including draft bars coupled to said frame on opposite sides of the harvester wheel at the side of the frame adjacent said tractor and converging forwardly therefrom and connected to said tractor, a corn receiving wagon disposed alongside said harvester and having a draft tongue, and draft means connecting said tongue to said tractor to position said wagon between the planes of the stubbleward wheels of said harvester and said tractor, respectively, whereby the tractor and wagon occupy only the two row spaces adjacent the row being harvested.

12. Corn harvesting apparatus, comprising in combination, a tractor having a pair of wheels spaced to run to opposite sides of two corn rows, respectively, a corn harvester disposed behind the tractor and offset on one side thereof and having a gatherer positioned to harvest corn from the next adjacent row on said one side, said harvester comprising a transverse frame on which said gatherer is mounted and a pair of laterally spaced supporting wheels therefor, and a hitch device including draft bars coupled to said frame on opposite sides of the harvester wheel at the side of the frame adjacent said tractor and converging forwardly therefrom and connected to said tractor, a corn receiving wagon disposed alongside said harvester and having a draft tongue and dirigible front wheels steered thereby, and fore and aft adjustable draft means connecting said tongue to said hitch device to position said wagon between the planes of the stubbleward wheels of said harvester and said tractor, respectively, whereby the tractor and wagon occupy only the two row spaces adjacent the row being harvested, and to position the dirigible wagon wheels substantially in transverse alignment with said harvester wheels, whereby said wagon and harvester will trail behind said tractor without interference with each other during turns.

13. Corn harvesting apparatus, comprising in combination, a tractor having a pair of wheels spaced to run at opposite sides of two corn rows, respectively, a corn harvester disposed behind the tractor and offset to one side thereof and having a gatherer positioned to harvest corn from the next adjacent row at said one side, said harvester comprising a transverse frame on which said gatherer is mounted and a pair of laterally spaced supporting wheels therefor, a hitch device including draft bars coupled to said frame at opposite sides of the harvester wheel on the side of the frame adjacent said tractor and converging forwardly therefrom and connected to said tractor, a corn receiving wagon disposed alongside said harvester and having a draft tongue, draft means connecting said tongue to said tractor to position said wagon between the planes of the stubbleward wheels of said harvester and said tractor, respectively, whereby the tractor and wagon occupy only the two row spaces adjacent the row being harvested, a transversely disposed wagon elevator disposed behind said harvester to receive corn therefrom and inclined upwardly and laterally to discharge into said wagon, said elevator including a discharge spout shiftably mounted thereon to discharge forwardly or rearwardly in said wagon, and means extending forwardly along said hitch device for shifting said spout from the operator's position on said tractor, whereby said wagon can be filled without the necessity for shifting the latter relative to said harvester.

14. An implement comprising a frame, a pair of laterally spaced ground engaging wheels journaled on said frame and on which the latter is tiltable about the axis of the wheels, a draft frame pivotally connected to said implement frame for vertical swinging movement about a transverse axis, a pair of toggle links having proximate ends swingably connected together in angled relation and swingably connected at their opposite ends to said frames, respectively, and counterbalancing means connected between said links and one of said frames and biased in a direction tending to straighten said links thereby urging said frames angularly relative to each other about the axis of pivotal connection therebetween.

15. A harvester comprising a frame carried on laterally spaced ground engaging wheels, gathering means fixed to said frame and extending forwardly to gather crops from the field during forward travel, draft means pivotally connected to said frame for relative vertical swinging movement about a transverse axis, a pair of links pivotally connected together and extending longitudinally of said frame and having their outer ends on opposite sides of said pivotal interconnection between said links, means pivotally connecting one of said links to said frame and the other of said links to said draft member on transverse axes, said links being normally inclined upwardly in angled relation toward said pivotal interconnection, and a counterbalancing spring connected to said links near said pivotal interconnection and extending generally vertically therefrom, said spring being biased to urge said links downwardly toward aligned position, thereby tending to angle said frame and draft member relative to each other to exert a lifting force upon said gathering means.

16. In a harvester, a frame comprising a main transverse beam, a plurality of gatherer supporting arms extending forwardly therefrom, and means for rigidly supporting said arms to said beam in cantilever relation comprising a channel-shaped brace for each arm, each of said braces being rigidly secured to said beam and adapted to receive said arm within the channel, and bolt means extending between the sides of said channel for securing the arm therein.

17. In a harvester, a frame comprising a main transverse beam, a plurality of gatherer supporting arms extending forwardly therefrom, and means for rigidly supporting said arms to said beam in cantilever relation comprising a channel-shaped brace for each arm, each of said braces being rigidly secured to said beam and adapted to receive said arm within the channel, bolt means extending through aligned apertures in the side walls of said channel and the arm adjacent the inner end of the latter, and bolt means spaced outwardly from said first bolt means and extending through apertures in the sides of said channel and over said arm to retain the latter within said channel but without weakening said arm by perforations.

18. In a harvester, a frame comprising a main transverse tubular beam, a pair of supporting wheels mounted at opposite ends thereof, and a plurality of cantilever arms extending forwardly and rearwardly from said beam, each of said arms comprising a channel-shaped bracket fixed to said beam and extending generally perpendicular thereto, a tubular member lying within the bracket, bolt means extending through aligned apertures in the side walls of said bracket and the arm adjacent the inner end of the latter, and bolt means spaced outwardly from said first bolt means and extending through apertures in the sides of said bracket and over said arm to draw the sides of said bracket into clamping engagement with said tubular member.

19. In an implement comprising a mobile tiltable frame and a draft member pivotally connected thereto on a transverse axis, a lever connected to said frame for tilting the latter, said lever extending longitudinally along said draft member, a support for said lever provided with a rack portion, means on said lever engageable with said rack portion to hold said lever in adjusted position, and means for pivotally supporting said lever support on said draft frame for swinging movement about a transverse axis comprising a pair of laterally spaced bracket members fixed to said draft frame and receiving said support therebetween, a pivot element extending transversely through aligned apertures in said support and said bracket members, and a clamping bolt interconnecting said bracket members in offset relation to said support for drawing said members together to closely embrace said support to eliminate excess lost motion between said support and said draft member.

NORMAN F. ANDREWS.
RUSSELL L. DORT.
JOHN VERGER.
WILBUR J. COULTAS.
STANLEY E. HILL.

REFERENCES CITED

The following references are of record in the file of this patent:

UNITED STATES PATENTS

| Number | Name | Date |
|---|---|---|
| 342,456 | Paine | May 25, 1886 |
| 1,041,070 | Hamacher | Oct. 15, 1912 |
| 1,238,683 | Kennedy | Aug. 28, 1917 |
| 1,264,227 | Uhl | Apr. 30, 1918 |
| 1,429,538 | Schetzel | Sept. 19, 1922 |
| 1,703,157 | Lima | Feb. 26, 1929 |
| 1,709,549 | Webber | Apr. 16, 1929 |
| 1,798,231 | Thiemann | Mar. 31, 1931 |
| 1,848,359 | Krause | Mar. 8, 1932 |
| 1,910,189 | Synck | May 23, 1933 |
| 1,940,851 | Everett et al. | Dec. 26, 1933 |
| 1,967,498 | Coultas et al. | July 24, 1934 |
| 1,968,998 | Elliott | Aug. 7, 1934 |
| 2,210,341 | Rund, Jr. | Aug. 6, 1940 |
| 2,302,656 | Drag | Nov. 17, 1942 |
| 2,307,804 | Ryan | Jan. 12, 1943 |
| 2,314,821 | Fritts | Mar. 23, 1943 |
| 2,374,925 | Corso | May 1, 1945 |